United States Patent [19]

Kuhn et al.

[11] Patent Number: 4,661,529

[45] Date of Patent: Apr. 28, 1987

[54] POLYURETHANE AND URETHANE-MODIFIED ISOCYANURATE FOAMS AND A POLYOL COMPOSITION USEFUL IN THEIR PREPARATION

[75] Inventors: E. Kuhn, Zurich; J. Den Boer; J. Thoen, both of Wadenswil, all of Switzerland

[73] Assignee: The Dow Chemical Company, Midland, Mich.

[21] Appl. No.: 809,640

[22] Filed: Dec. 16, 1985

Related U.S. Application Data

[60] Division of Ser. No. 638,934, Aug. 9, 1984, Pat. No. 4,607,064, which is a continuation of Ser. No. 495,217, May 16, 1983, abandoned.

[51] Int. Cl.$^4$ .................. C08G 18/14; C08G 18/32
[52] U.S. Cl. ........................... 521/137; 252/182; 521/173; 521/174; 521/176; 521/914; 521/902
[58] Field of Search ............... 252/182; 521/173, 174, 521/176, 914, 137

[56] References Cited

U.S. PATENT DOCUMENTS

| | | | |
|---|---|---|---|
| 3,042,631 | 7/1962 | Strandskov | 521/914 |
| 3,169,934 | 2/1965 | Dennett et al. | 521/914 |
| 3,336,242 | 8/1967 | Hampson et al. | 521/914 |
| 3,461,086 | 8/1969 | Mogford et al. | 521/914 |
| 3,535,307 | 10/1970 | Moss et al. | 521/914 |
| 3,546,145 | 12/1970 | Granger et al. | 260/2.5 |
| 3,857,800 | 12/1974 | Fishbein et al. | 521/914 |
| 3,887,505 | 6/1975 | Demou et al. | 521/914 |
| 3,922,238 | 11/1975 | Narayan et al. | 260/2.5 |
| 3,928,258 | 12/1975 | Alexander | 521/914 |
| 3,940,517 | 2/1976 | De Leon | 427/373 |
| 3,943,075 | 3/1976 | Fishbein et al. | 260/2.5 |
| 3,981,828 | 9/1976 | Demou et al. | 521/174 |
| 4,067,830 | 1/1978 | Kresta | 521/174 |
| 4,129,697 | 12/1978 | Schaepel | 521/76 |
| 4,256,846 | 3/1981 | Ohashi et al. | 521/176 |
| 4,259,452 | 3/1981 | Yukuta et al. | 521/914 |
| 4,273,884 | 6/1981 | Dominguez et al. | 521/914 |
| 4,299,924 | 11/1981 | Nomura et al. | 521/176 |
| 4,302,551 | 11/1981 | Horn et al. | 521/173 |
| 4,379,105 | 4/1983 | Taylor et al. | 521/914 |
| 4,393,015 | 7/1983 | Kaneda | 521/914 |

FOREIGN PATENT DOCUMENTS 1236858 6/1971 United Kingdom .

*Primary Examiner*—Herbert S. Cockeram
*Attorney, Agent, or Firm*—G. C. Cohn

[57] ABSTRACT

Isocyanate-derived foams are prepared from an isocyanate, catalyst, blowing agent, foam stabilizing surfactant and at least two active hydrogen-containing compounds wherein one of the active hydrogen-containing compounds is an alkylene oxide polymer having an equivalent of at least 300 and being composed of at least about 10 weight percent, based on a total weight of the polymerized alkylene oxide in the polymer, of a polymerized ethylene oxide.

13 Claims, No Drawings

POLYURETHANE AND URETHANE-MODIFIED ISOCYANURATE FOAMS AND A POLYOL COMPOSITION USEFUL IN THEIR PREPARATION

This is a divisional of application Ser. No. 638,934, filed Aug. 9, 1984, now U.S. Pat. No. 4,607,064 which is a continuation of application Ser. No. 495,217, filed May 16, 1983.

BACKGROUND OF THE INVENTION

The present invention relates to isocyanate-derived foams and to a precursor composition useful in their preparation, more particularly, to polyurethane and urethane-modified, polyisocyanurate foams and to a precursor useful in the preparation of said foams.

Due to their desirable physical properties such as dimensional stability, compressive strength, thermal conductivity and the like, isocyanate-derived foams are employed in a wide variety of applications including insulation, structural reinforcement and electrical encapsulation. In addition to the aforementioned properties, for use in various applications, the foams must also advantageously exhibit some degree of fire resistance.

A foam exhibiting comparatively excellent fire-resistant properties is obtained by the trimerization reaction of an isocyanate to form an isocyanurate. However, the resulting, unmodified polyisocyanurate foams are extremely friable (weak) materials which have a tendency to crumble or to be reduced to a powder. In addition, when subjected to elevated temperatures, the unmodified polyisocyanurate foams are liable to form cracks. These cracks form bridges across which occurs a breakdown of the otherwise high insulating properties of the foam.

To reduce the friability of an unmodified polyisocyanurate foam, it has heretofore been common to employ relatively small amounts of an active hydrogen-containing compound per each equivalent of isocyanate to make a urethane-modified, isocyanurate foam. See, for example, U.S. Pat. Nos. 3,940,517; 3,922,238 and 4,024,019. Unfortunately, elevated temperatures are often required to initiate the reaction of the isocyanate in the formation of the disclosed foams. This necessitates the energy consuming and otherwise undesirable step of heating the reaction mixtures prior to foam formation which often results in processing problems and/or non-uniformity in the resulting foam. In addition, a number of the known urethane-modified isocyanurate foams can only be prepared using a prepolymer of the reaction product of an isocyanate with a polyol as one of the reactants. Moreover, further increases in the strength of the foams are still required.

In view of the aforementioned deficiencies in the prior art, it remains highly desirable to provide an isocyanate-derived foam having desirable physical properties, including fire-resistant properties, which foam can readily be prepared from a reaction mixture having desired processability characteristics.

SUMMARY OF THE INVENTION

Accordingly, in one aspect, the present invention is a foam derived from an isocyanate, a catalyst, a blowing agent, a foam stabilizing surfactant and at least two active hydrogen-containing compounds reactive with an isocyanate wherein one of said active hydrogen-containing compounds is an alkylene oxide polymer having an average equivalent weight of at least 300 and being composed of at least about 10 weight percent, based on a total weight of the polymerized alkylene oxide in the polymer, of a polymerized ethylene oxide.

In another aspect, the present invention is a method for preparing an isocyanate derived foam, said method comprising the step of mixing the isocyanate and two active hydrogen-containing compounds in the presence of a blowing agent at conditions sufficient to foam the mixture.

In still another aspect, the present invention is a precursor composition for the preparation of foams derived from an isocyanate, said precursor comprising (a) a compound containing at least two active hydrogens reactive with an isocyanate and (b) an alkylene oxide polymer, different from compound (a), containing at least two active hydrogens reactive with an isocyanate, said alkylene oxide polymer having an equivalent weight of at least 300 and being composed of at least about 10 weight percent, based on a total weight of the polymerized alkylene oxide in the polymer, of polymerized ethylene oxide. Hereinafter, this precursor composition will be referred to as a "polyhydric precursor".

DETAILED DESCRIPTION OF THE INVENTION

Isocyanate-derived foams of excellent properties can be prepared using the described combination of an active hydrogen-containing compound and the ethoxylated, high-molecular weight, alkylene oxide polymer. By varying the relative concentration of the described active hydrogen-containing compounds and the type of polymerization catalyst employed, both polyurethane and urethane-modified polyisocyanurate foams can be prepared from said polyhydric precursor, with the precursor being particularly useful in the preparation of urethane-modified, isocyanurate foams. The urethane-modified, polyisocyanurate foams prepared using the described polyhydric precursor exhibit unexpectedly superior compressive strengths and surprisingly good fire-resistant properties without the excessive brittleness or friability often exhibited by many urethane-modified isocyanurate foams. This is due to the relatively high amounts of urethane linkages which can be introduced into the foams of the present invention without a significant and expected loss in fire resistant properties. As used herein, the term "fire resistant" properties is used for comparative purposes only and is not used or to be implied to project the actual performance of a foam in an actual fire situation. As the foams are composed of organic materials, they will burn if exposed to sufficient heat and oxygen.

The polyurethane and urethane-modified polyisocyanurate foams of the present invention can be employed in a wide variety of applications including thermal insulation and/or structural reinforcement in housing, refrigerators, freezers and the like, and electrical encapsulation.

The isocyanate derived foams of the present invention are prepared using at least two active hydrogen-containing components, at least one of which components is an alkylene oxide polymer containing significant amounts of polymerized ethylene oxide. As used herein, the term "active hydrogen-containing component" refers to a compound containing at least two active hydrogen-containing groups each of which is capable of reacting with an isocyanato group. For the purposes of the present invention, such active hydrogen-containing compounds are compounds containing at least two active hydrogens as determined by the well known Zerewitinoff test such as described by Kohler in Journal of the American Chemical Society, 49,3181 (1927). Representative active hydrogen-containing groups as determined by the Zerewitinoff method are —OH, —NH—, —COOH and —SH. In general, the active hydrogen-containing compounds advantageously employed herein will contain two or more —OH groups, two or more —SH groups or at least one —OH group and at least one —SH or —NH— group.

At least one of the active hydrogen-containing components used herein is an alkylene oxide polymer containing at least two active hydrogens reactive with an isocyanate, said alkylene oxide polymer having an equivalent weight of at least 300 and being composed of at least 10 weight percent, based on the total weight of the polymerized alkylene oxide in the polymer, of polymerized ethylene oxide. For the purposes of this invention, the "equivalent weight" is the molecular weight of the alkylene oxide polymer, including the residue of any initiator employed in its preparation, divided by the number of equivalents per each molecule. The number of equivalents refers to the number of active hydrogen-containing groups capable of reacting with an isocyanate per molecule of the ethoxylated alkylene oxide. In general, the number of active hydrogen groups in the ethoxylated, alkylene oxide polymer will vary from 2 to 8, with from 2 to 4 active hydrogen-containing groups more generally being employed.

Although the ethoxylated alkylene oxide polymer most advantageously employed herein will vary depending on a variety of factors including the other components employed in preparing the isocyanate derived foam, particularly the other active hydrogen compound(s), and the desired properties of the resulting foam, the polymer advantageously has an equivalent weight of at least 500, more preferably at least 700 and comprises at least 30, more advantageously at least 50, weight percent, based on the total weight of the polymerized alkylene oxide, of polymerized ethylene oxide mers, preferably randomly distributed throughout the polymer chain. The OH number (which is defined as the milligrams of potassium hydroxide equivalent to the number of OH groups per gram of an active hydrogen-containing compound) of the ethoxylated alkylene oxide polymer advantageously is from 20 to 200, preferably from 20 to 110, more preferably from 20 to 80.

Preferred ethoxylated alkylene oxide polymers can be represented by the general structural formula:

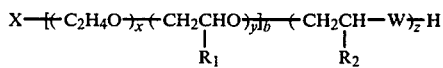

wherein X is the residue of an organic active hydrogen initiator, x is the summation of the ethylene oxide mers, distributed randomly and/or as a block through the alkylene oxide polymer chain, y is the summation of the propylene, butylene and/or pentylene (amylene) oxide mers, distributed randomly and/or as a block through the alkylene oxide polymer chain; $x/(x+y)$ is at least 0.1; $y/(x+y)$ is less than 0.9; $R_1=CH_3$, $C_2H_5$ or $C_3H_7$; $R_2=H$, $CH_3$, $C_2H_5$ or $C_3H_7$; b is from 2 to 8; W=O, S or NH and x, y, b and z are such that the equivalent weight of the polymer is from 300 to 2500.

Organic active hydrogen initiators useful in the preparation of the ethoxylated alkylene oxide polymer are any of those compounds which are capable of initiating the polymerization of an alkylene oxide.

In general, the organic active hydrogen initiators are compounds containing two or more hydroxy, amine, thiol or carboxyl groups or a mixture of one or more hydroxy and one or more amine, thiol or carboxyl group. Representative of such compounds are the mono- and di-saccharides such as sucrose; water; the polyhydric alkyl alcohols (wherein the term "polyhydric" refers to a compound containing two or more active hydrogen-containing groups) and halogenated polyhydric alkyl alcohols such as 2-methyl-propane-1,3-diol, trimethylol propane, trimethylol ethane, the glycols (e.g., ethylene glycol, 1,2-propylene glycol, 1,3-propylene glycol, 1,4-propylene glycol; 1,4-butylene glycol, 2,3-butylene glycol, 1,6-hexane diol, 1,8-octane diol), hydroxy, amino or thishydroxy terminated polyalkylene polyethers such as the reaction products of ethylene glycol (e.g., diethylene glycol, triethylene glycol, tetraethylene glycol and higher polyethylene glycols); propylene glycol (e.g., dipropylene glycol and higher polypropylene glycols); butylene glycol (e.g., dibutylene glycol and higher polybutylene glycols); glycerol, pentaerythritol, 1,2,6-hexane triol, 1,2,4-butane triol, sorbitol; polyhydric cycloalkyl alcohols such as cyclohexane diol, and cyclohexane dimethanol (1,4-bis-hydroxy-methylcyclohexane); the polyhydric aromatic alcohols and halogenated, polyhydric aromatic alcohols such as hydroquinone and other derivatives of phenol, e.g., 2,2-bis(4-hydroxy phenyl)propane commonly known as bisphenol A and its halogenated derivatives such as 2,2bis(4-hydroxyl-3,5-dibromo phenyl)polyhydric alkyl amines such as the ethylene amines, ethanol amines and ammonia; polyhydric cycloalkyl amines such as isophorodiamine; polyhydric aromatic amines such as toluene diamine and other derivatives of aniline; phosphoric acid; Mannich condensation products; hydroxy-terminated polyacetals such as the reaction product of formaldehyde or other suitable aldehyde with a polyhydric alcohol or an alkylene oxide; polyhydric alkyl triols such as 1,2-ethanedithiol, 1,2-propanedithiol, 1,3-propanedithiol, polyhydric alkenyl thiols such as 2-butene-1,4-dithiol; polyhydric alkenyl thiols such as 3-hexyne-1,6-dithiol; and the like. For the purposes of this invention, the oxyethylene, oxypropylene, oxybutylene or oxypentylene groups introduced into the ethoxylated, alkylene oxide, polymer by the initiator (e.g., an ethylene or propylene glycol initiator or a polyalkylene polyether initiator such as polyethylene or polypropylene glycol) are considered to be polymerized alkylene oxide in determining the amounts of polymerized ethylene oxide contained by the ethoxylated alkylene oxide polymer. Preferred of the organic active hydrogen initiators are the polyhydric alkyl alcohols such as glycerol.

The specific composition, e.g., amount of polymerized ethylene oxide mers and equivalent weight, of the ethoxylated alkylene oxide polymer, affect the properties of the isocyanate derived foams prepared therefrom, the specific polymers most advantageously employed are selected on the basis of the properties desired. In general, to obtain a foam of preferred properties, b is from 2 to 6; W is oxygen; x, y, b and z are such that the equivalent weight is from 500 to 2000. The amount of polymerized ethylene oxide mers most advantageously contained by the polymer are dependent on a variety of factors including whether the polymerized ethylene oxide mers are distributed randomly or as a block throughout the polymer. Specifically, if the ethylene oxide mers are distributed as a block capping the alkylene oxide chain, the ethylene oxide mers advantageously comprise less than thirty percent of the alkylene oxide mers, i.e., $x/(x+y)$ is less than 0.3, due to the waxy product formed at higher concentrations of ethylene oxide cap. In polymers where the polymer is not capped with a block of ethylene oxide mers, $x/(x+y)$ is preferably at least 0.4 and $y(y+x)$ is less than 0.6. Most preferably, the polymerized ethylene oxide mers are randomly distributed throughout the alkylene oxide chain, $x/(x+y)$ being at least 0.5, $y/(x+y)$ being less than 0.5, $R_1$ being $CH_3$ and $R_2$ being H or $CH_3$, b being from 2 to 4 and x, y, b and z being such that the equivalent weight of the ethoxylated alkylene oxide polymer is from 700 to 1700.

Methods of preparing the highly ethoxylated alkylene oxide polymers wherein the ethylene oxide mers form a block or are randomly distributed throughout the polymer chain are well known in the art and reference is made thereto for the purposes of this invention.

Representative active hydrogen-containing compounds useful as the other (second) active hydrogen-containing component in the practice of the present invention are those compounds useful in the preparation of isocyanate-derived foams. Such materials are well known in the art and reference is made thereto for the purposes of this invention. Illustrative examples of such active hydrogen-containing compounds are presented in U.S. Pat. Nos. 3,903,346; 3,909,465; 3,919,128; 3,922,238; 3,940,517 and 3,981,829, all of which are hereby incorporated by reference.

A representative example of such active hydrogen-containing compounds are the polyether polyols such as the polyoxyalkylene polyols prepared, for example, by the reaction of an active hydrogen initiator as defined hereinbefore, e.g., a polyhydric alcohol, thiol or amine, a mono- or di-saccharide, and phosphoric acid with an alkylene oxide such as ethylene oxide, propylene oxide, butylene oxide, pentalene oxide, styrene oxide, a halo-substituted epoxide such as epihalohydrin, e.g., epichlorohydrin; tetrahydrofuran or an alkylene oxide adduct thereof; or mixtures thereof.

Other representative examples of active hydrogen-containing compounds useful herein include the hydroxy-terminated polyesters such as those obtained by the reaction of a polycarboxylic acid, e.g., oxalic or maleic acid, or a carboxylic acid anhydride with a polyhydric alcohol, e.g., ethylene glycol or 1,3-propylene glycol; graft polyols such as obtained by the polymerization product of a vinyl monomer in a reactive polyol medium (see, for example, U.S. Pat. Nos. 3,383,351; 3,304,273 and 3,652,639); hydroxy terminated polyacetals such as the reaction product of formaldehyde or other suitable aldehydes with a polyhydric alcohol or an alkylene oxide.

The compounds most advantageously employed as the second active hydrogen-containing component in the practice of the present invention will vary depending on the type of foam to be prepared, i.e., a polyurethane or urethane-modified isocyanurate foam, and the properties desired in the resulting foam. In general, the compounds preferably employed will contain from 2 to 8, more preferably from 2 to 5, active hydrogens and possess a relatively high —OH number which is preferably greater than 100, more preferably between 150 and 900, most preferably between 200 and 800. Of such compounds, the second active hydrogen-containing component is preferably a polyalkylene polyol such as prepared by the reaction of one or more alkylene oxides with an active hydrogen-containing initiator, particularly a polyhydric aromatic alcohol or amine or a polyhydric alkyl alcohol, a mixture of two or more such polyalkylene polyols or a mixture of one or more such polyalkylene polyols with one or more other polyol.

The amount of each active hydrogen-containing component employed in the preparation of the isocyanate derived foams is dependent on a variety of factors including the specific first active hydrogen-containing component employed, the foam to be prepared and the desired properties of said foams. For example, in many cases, the ethoxylated, alkylene oxide, polymer is blended with the other active hydrogen-containing components to improve the processability of these other components. Alternatively, in other cases, the ethoxylated alkylene oxide polymer is employed in combination with the other active hydrogen-containing component to obtain a foam having the desired balance of properties.

In general, the ethoxylated alkylene oxide polymer is conventionally employed in an amount from 5 to 95, preferably from 5 to 60, more preferably from 10 to 55, weight percent and the other active hydrogen-containing components are employed in an amount from 5 to 95, preferably from 40 to 95, more preferably from 45 to 90, weight percent, said weight percents being based on the total weight of the active hydrogen-containing components.

The isocyanurate derived foams of the present invention are prepared by admixing the active hydrogen-containing components with an isocyanate, catalyst, blowing agent, a surfactant and, optionally, fire retardant agent(s), coloring agent, plasticizer(s) or filler(s) at conditions to prepare the desired foam.

The isocyanates suitably employed herein are compounds having two or more reactive isocyanato groups (hereinafter referred to as a "polyisocyanate") and include those polyisocyanates employed heretofore in the preparation of isocyanate-derived foams. Such polyisocyanates useful in the preparation of polyurethane and urethane-modified isocyanurate foams include the polyisocyanates of aliphatic, alicyclic and aromatic hydrocarbons or inertly substituted aliphatic, alicyclic and aromatic hydrocarbons such as a halogenated aromatic. Representative examples of polyisocyanates include 2,4-toluene diisocyanate, 2,6-toluene diisocyanate; polymethylene polyphenylisocyanates, m- or p-phenylene diisocyanate; diphenyl-4,4'-diisocyanate, naphthalene diisocyanate; 1-ethylbenzene, 2,4-diisocyanate, 2,4,6-toluene triisocyanate; 4,4',4''-triphenylmethane-2,2'-5,5'-tetraisocyanate; hexamethylene-1,6-diisocyanate; methylene-bis(4-cyclohexylisocyanate) and 1,3,5-benzene triisocyanate. Preferred polyisocyanates are the polymethylene polyphenylisocyanates, particularly the polymethylene polyphenylisocyanates having a functionality from 2.1 to 3.2, preferably from 2.5 to 3.2, and an equivalent weight from 120 to 180, more preferably from 130 to 145, such as produced by the phosgenation of a polyamine obtained by the acid catalyzed condensation research of aniline with formaldehyde. Mixtures of one or more polyisocyanates can also be employed herein. One such preferred polymethylene polyphenyl isocyanate is Voranate M 269, sold by The Dow Chemical Company.

The relative proportion of the polyisocyanate employed in the preparation of the isocyanate-derived foams will vary depending on a variety of factors including the specific polyisocyanate and active hydrogen-containing components being employed, the type of foam being prepared (i.e., a polyurethane or urethane-modified isocyanurate foam) and the desired properties of said foam. In general, in the preparation of a polyurethane foam, the polyisocyanate is employed in amounts sufficient to provide from 0.8 to 1.1, preferably from 0.9 to 1.05, reactive isocyanato groups for each active hydrogen-containing group contained in the foaming mixture, i.e., the foaming mixture contains from 80 to 110, preferably from 90 to 105, percent of the stoichiometric amount of the polyisocyanate required to completely react with the active hydrogen-containing components in the mixture, including any water which may be present as a source of blowing agent. Alternatively, in the preparation of urethane-modified isocyanurate foams, the polyisocyanate is generally employed in relatively greater amounts with the foaming mixture containing significantly more isocyanato groups than active hydrogen-containing groups. In general, the polyisocyanate is employed in amounts such that the foaming mixture contains from 1.2 to 5, preferably from 1.4 to 3, reactive isocyanato groups per active hydrogen-containing group, i.e., the foaming mixture contains from 120 to 500, preferably from 140 to 300, percent of the stoichiometric amount of the polyisocyanate required to completely react with the active hydrogen-containing components.

The catalyst employed in the preparation of the isocyanate-derived foams is dependent primarily on whether a polyurethane or urethane-modified, isocyanurate foam is being prepared. In the preparation of polyurethane foams, materials which are capable of catalyzing the reaction between the polyisocyanate and active hydrogen-containing components are suitably employed herein. Representative of such catalysts are various amines including tertiary amines such as triethylamine, triethylene diamine, dimethyl benzyl amine, tetramethyl ethylene diamine, pentamethyl diethylene triamine, tributylamine, trioctyl amine, triisopropanolamine, triethanolamine, N,N,N',N'-tetramethyl-1,3-butanediamine, 2,4,6-tris(dimethylaminomethyl)phenol, tetramethyl ethylene diamine, pentamethyl diethylene triamine, N,N-dimethyl cyclohexylamine, 1,3,5-tris-(N,N-dialkylamino-alkyl)-s-hexahydrotriazines and the water or alkylene oxide adduct thereof, N-alkyl morpholines such as N-ethylmorpholine and N-methylmorpholine, piperazine and piperazine derivatives such as N-methylpiperazine and N-methyl-N'-dimethylaminoethyl piperazine; imidazol such as 1,2-dimethyl imidazol; the organic tin compounds such as the tin salts of a carboxylic acid, including tin hexanoate, stannous oleate, stannous octoate, the di- and trialkyl tin salts of a carboxylic acid, including dibutyl tin dilaurate and tributyl tin octonoate, bis(2-ethylhexyl)-tin oxide and dibutyl tin chloride; organic compounds of other polyvalent metals such as zinc, lead and nickel, e.g., nickel acetylacetonate; Friedel Craft catalysts such as $SnCl_4$, $AlCl_3$ and $TiCl_4$, and the like. Mixtures of one or more of such catalysts can also be employed. The preferred catalysts are generally the amines, particularly tertiary amines, a mixture of two or more amines, or a mixture of one or more amine with one or more metal catalysts, particularly an organic tin compound. In the preparation of polyurethane foams, the catalyst is employed in a catalytically effective amount, with the amine catalyst generally being employed in an amount from 0.05 to 5, preferably from 0.1 to 2, weight percent based on the total weight of the polyisocyanate. When employed in conjunction with the amine catalyst, the metal catalysts are employed in smaller amounts with from 0.01 to 2 weight percent based on the total weight of the polyisocyanate being generally advantageously employed.

In the preparation of an urethane-modified, isocyanurate foam, a material capable of catalyzing the trimerization reaction of an isocyanate is contained in the reaction mixture. Trimerization catalysts are well known in the art and reference is made thereto for the purposes of the present invention. Representative trimerization catalysts include the quaternary ammonium compounds such as benzyl trimethylammonium hydroxide, the N-hydroxypropyl trimethylammonium salt of formic acid and other onium compounds, alkali metal hydroxides such as potassium hydroxide, the alkali metal alkoxides such as sodium methoxide, the alkali metal acid salts of carboxylic acids, particularly the saturated aliphatic monocarboxylic acids having from 2 to 12 carbon atoms, such as sodium acetate, potassium acetate, potassium 2-ethylhexoate, potassium adipate and sodium benzoate; various tertiary amines such as trimetholamine, triethylamine, tetramethyl guanidine, 2,4,6-tris(-trimethylaminomethyl)phenol, triethylene diamine and N,N,N',N'-tetramethyl, 1,3-butane diamine; the nonbasic metal salts of a carboxylic acid such as lead octate and the like. Mixtures of two or more of said trimerization catalysts or mixtures of one or more of said catalysts with a compound which is not specifically capable of catalyzing the trimerization of an isocyanate to a substantial extent can be employed. For example, although a catalyst such as a triazine derivative is capable of catalyzing both the trimerization reaction and the formation of urethane bonds by the reaction of the isocyanate with an active hydrogen-containing compound and requires no auxillary urethane catalyst. Trimerization catalysts which are not specifically capable of catalyzing the reaction between the polyisocyanate and the active hydrogen-containing compound are preferably employed in combination with a material which catalyzes the reaction of an isocyanate with an active hydrogen-containing compound, preferably the aliphatic tertiary amines such as 1,4-diazobicyclo(2,2,-2)octane and N,N-dimethyl amine and the organic tin compounds are employed in combination with the trimerization catalyst. The preferred catalyst system comprises a quaternary ammonium compound, an alkali metal acid salt and a catalyst specifically capable of catalyzing the reaction of an isocyanate with an active hydrogen-containing compound. The amount of trimerization catalyst most advantageously employed herein is dependent on a variety of factors including the specific polyisocyanate employed and the effectiveness of the particular catalyst or catalyst system employed. In general, the trimerization catalyst(s) is employed in amounts from 0.5 to 8, preferably from 0.7 to 5, weight percent based on the weight percent of the active hydrogen-containing compounds. If employed, the catalyst specifically used to catalyze the reaction of the isocyanate with the active hydrogen-containing material is employed in amounts from 0.1 to 30 weight percent based on the total weight of the active hydrogen-containing compounds. In the preferred catalyst system, the quaternary ammonium is employed in an amount from 0.5 to 5, preferably from 0.7 to 3, weight percent; the alkali metal acid salt in an amount from 0.5 to 3, preferably from 0.6 to 2, weight percent and the catalyst specifically employed to catalyze the reaction of the isocyanate with the active hydrogen-containing components in an amount from 0.1 to 3 weight percent, said weight percents being based in the total weight of the active hydrogen-containing compounds.

Blowing agents useful in the preparation of isocyanate derived foams are well known in the art and reference is made thereto for the purposes of the present invention. Suitable blowing agents include water and other liquids or liquified gases which generate a gas by decomposition or reaction with one or more of the components in the foaming mixture (e.g., the reaction of water with an isocyanate to form $CO_2$ gas) or which vaporize at or below the conditions (i.e., temperature and pressure) created by the exothermic foaming. In general, the liquids and liquified gases advantageously employed are materials having a boiling point from $-80°$ to $100°$ C., preferably from $0°$ to $50°$ C. Representative blowing agents useful herein include the halogenated, preferably the chlorinated and/or the fluorinated hydrocarbons such as trichlorofluoromethane, dichlorodifluoromethane, chlorofluorobutane, monochloroethane, monochloromonofluoroethane, 1,2-dibromo-1,1,2,2-tetrafluoroethane, 1,2-dichloro-1,1,2,2-tetrafluoroethane, 1,1,2-trifluoroethane, dichloromethane, 1,1,1-trifluoro-2-fluoro-3,3-difluoro-4,4,4-trifluorobutane, hexafluorocyclobutane and octofluoro-cyclobutane and the like; the lower molecular weight alkanes and alkenes; the lower molecular weight dialkyl ethers, e.g., acetone; and mixtures thereof. Preferred blowing agents of the halogenated alkanes, particularly the fluorinated alkanes which may also be otherwise halogenated, or a mixture of water plus a fluorinated alkane. The blowing agent is employed in an amount sufficient to give a foam of desirable density. Although such amount will vary depending on the specific components of the foaming mixture, the blowing agent will generally be employed in amounts from 1 to 50, preferably from 5 to 40, weight percent, based on the total weight of the active hydrogen-containing compound.

The reaction mixture also contains a surfactant or other cell-size control agent. Such materials are well known in the art and reference is made thereto for the purpose of the present invention. In general, representative of such foam stabilizing surfactants are alkoxy silanes, polysilylphosphonates, polydimethyl siloxanes, the condensates of ethylene oxide with a hydrophobic base formed by condensing propylene oxide with propylene glycol, the alkylene oxide adducts of ethylene diamine, the polyoxyalkylene esters of long chain fatty acids and sorbitan, and (siloxane-oxyalkylene) block copolymers. Preferred of such materials are the siloxane-oxyalkylene block copolymers. Illustrative block copolymers are described in U.S. Pat. Nos. 2,834,748; 2,917,480; 3,505,377; 3,507,815 and 3,563,924. Representative of such material copolymers is the polydimethylsiloxanepolyoxyalkylene block copolymers sold by the tradename "DC-193" by Dow Corning Corporation and L-5420 and L-5430 by Union Carbide Corporation. When employed, the foam stabilizing such actant is generally employed in amounts from 0.05 to 5, preferably from 0.1 to 2, weight percent based on the total weight of the active hydrogen-containing compounds.

In addition to the described components, the foaming mixture can optionally, but often advantageously contain any of a variety of additives commonly employed in the preparation of rigid polyurethane and urethane-modified isocyanurate foams. Representative of such additives include fire-retardant agents such as tri-(2-chloroethyl)phosphate, fillers such as carbon black, barium sulfate and whiting; (calcium carbonate) dyes; pigments; anti-yellowing agents, fungicides; plasticizers and the like. The additives conventionally employed and their effects on the resulting foam product are well known in the art and reference is made thereto for the purpose of this invention.

In the preparation of the polyurethane or urethane-modified isocyanurate foams of the present invention, the ingredients comprising the reaction mixture are admixed to give a uniform blend of the ingredients and subsequently foamed. In one method for preparing the foam, each component of the reaction mixture, including the two active hydrogen components, are separately delivered to a suitable mixing device and subsequently foamed. Alternatively, in a preferred method for preparing the foam, the active hydrogen components are advantageously pre-mixed prior to their admixture with the polyisocyanate. The pre-mixture of the active hydrogen-containing compounds can also contain one or more of the other component inert to the active hydrogen-containing compounds contained by said pre-mixture. For example, inert blowing agents, as well as water, can be in the pre-mixture. In addition, the foam stabilizing surfactant, catalyst and any auxillary fire-retarding agents can also be incorporated within said pre-mixture. Prior to the mixture of the active hydrogen-containing components with the polyisocyanate, the blowing agent is necessarily maintained at conditions sufficient to maintain it as an uniform mixture with the active hydrogen-containing components until foaming is desired. Upon mixing of the polyisocyanate and the active hydrogen-containing component, foaming occurs. Such reaction of the isocyanate and active hydrogen-containing components and foam formation will generally occur at room temperatures, i.e., temperatures from $150°$ to $30°$ C.

The following examples are set forth to illustrate the present invention and should not be construed to limit its scope. In the examples, all parts and percentages are by weight unless otherwise indicated. The fire resistance properties are set forth for purposes of comparison only. All known synthetic polymers will burn when subject to a sufficiently intense heat source. Thus, the test results may not reflect the properties of the foam under actual fire conditions.

EXAMPLE 1

An ethoxylated, glycerine initiated, alkylene oxide polymer is prepared having polymerized ethylene oxide and propylene oxide mers randomly distributed through the alkylene oxide polymer chains by reacting glycerine with a mixed feed comprising 75 percent ethylene oxide and 25 percent propylene oxide, said percents being based on the total amount of alkylene oxide in the feed. The resulting product is a triol having an equivalent weight of 1750 and an OH number of 32.

A conventional polyol for use in the preparation of rigid urethane-modified isocyanurate foams is prepared by reacting sucrose with propylene oxide. The resulting product is a polyol having an equivalent weight of 137 and an OH number of 411.

A pre-foaming mixture is prepared by admixing 50 parts of the ethoxylated, alkylene oxide, polymer with 50 parts of the conventional, rigid polyol, 30 parts of a trichlorofluoromethane blowing agent, 1.2 parts of a silicon surfactant sold as L-5420 by Union Carbide Company, 0.25 parts of an amine catalyst and 2.5 parts of a trimerization catalyst at conditions sufficient to form a generally homogeneous mixture. Subsequently, 180 parts of a polyisocyanate sold under the tradename Voranate M-269, is admixed with the pre-mixture. Immediately thereafter, the resulting mixture is poured into a block and allowed to rise freely.

The resulting foam had a free rise density of 41.5 kilogram per cubic meter ($kg/m^3$), a compressive strength in the direction parallel to rise of 152 kilo pascals (kPas) and in the direction perpendicular to form rise of 88 kPas. The fire resistant properties of the foam are such that when tested by the techniques described in DIN 4102, Test Method B-2, the maximum flame height is 15 cm and the flame is extinguished in 15 seconds.

In an identical manner, a foam is prepared from (1) 45 parts of an ethoxylated alkylene oxide polymer prepared by the reaction of ethylene oxide with a propylene oxide adduct of glycerine (said polymer being comprised of a block of polymerized propylene oxide mers capped with a block of polymerized ethylene oxide mers wherein the ethylene oxide mers, comprise 15 percent of the polymerized alkylene oxide) and (2) 55 parts of a conventional sucrose initiated poly(propylene oxide). The resulting foam exhibits a compressive strength of 98 kPas in the direction parallel to rise and 56 kPas in the direction perpendicular to rise and the fire resistant properties are such that the maximum flame height is 13 cm and the flame is extinguished in 15 seconds.

The properties of these foams are superior to a foam prepared using 100 parts of the conventional sucrose initiated poly(propylene oxide) alone (no ethoxylated polymer employed) which disintegrates (falls apart as a powder) on relatively mild rubbing. As evidenced by this result, a urethane-modified isocyanurate foam can be prepared using a conventional polyol not normally useful in the preparation of such foams in combination with the ethoxylated polymer.

EXAMPLE 2

A conventional polyol useful in the preparation of rigid urethane-modified, isocyanurate foams, is prepared by reacting toluene diamine with propylene oxide. The resulting polyol (Polyol A) has a hydroxyl number of 294 and an equivalent weight of 191. A second polyol conventionally employed in the preparation of rigid polyurethane foams is prepared by reacting ethylene diamine with propylene oxide. The resulting polyol (Polyol B) has a hydroxyl number of 640 and an equivalent weight of 88.

An ethoxylated, alkylene oxide, polymer is prepared by reacting glycerine with a mixed feed comprising 10 percent of ethylene oxide and 90 percent of propylene oxide. The resulting polymer has a hydroxyl number of 48 and comprises polymerized ethylene and propylene oxide mers randomly distributed throughout the alkylene oxide polymer chain.

A pre-foaming mixture is prepared by admixing, at conditions sufficient to form a uniform mixture, 52.5 parts of Polyol A, 17.5 parts of Polyol B, 1 part of a poly(alkyl siloxane-oxyalkylene) foam stabilizer, 1.6 parts of trichlorofluoromethane blowing agent, 12.5 parts of a tris-(B-chloroethyl)phosphate (an auxillary fire-retarding agent) and 12.5 parts of the ethoxylated alkylene oxide polymer. A rigid polyurethane (Sample No. 1) is subsequently prepared by admixing 100 parts of the pre-mixture with 160 parts of methylene diisocyanate, pouring the resulting reaction mixture into a block and allowing the reaction mixture to rise freely.

Various other rigid, polyurethane foams (Samples 2-5) are prepared in an identical manner except using ethoxylated alkylene oxide polymers having a hydroxyl number of 33 and the various percentages of polymerized ethylene oxide mers as specified in Table I randomly distributed throughout the alkylene oxide polymer chain. In addition, a rigid polyurethane foam (Sample No. 6) is prepared using the reaction product of water with a mixed feed of 70 percent ethylene oxide and 30 percent propylene oxide as the ethoxylated alkylene oxide polymer.

For purposes of comparison, a rigid polyurethane foam (Sample No. C) is prepared which is identical to Sample No. 1 except that the pre-mixture employed in its preparation contains no ethoxylated alkylene oxide polymer.

The cream time, gel time and tack free time experienced in the preparation of each foam is measured as well as the compressive strength and fire resistance of the resulting foam. The results of this testing are recorded in Table I.

TABLE I

| | Ethoxyolated Polymer[1] | | | Foam Preparation[2] | | | Foam Properties | | |
|---|---|---|---|---|---|---|---|---|---|
| Sample No. | Type | Initiator | EO Content % | Cream Time Sec. | Gel Time Sec. | Tack free Time Sec. | Compressive Strength kPa[3] | Fire Resistance cm[4] | Density[5] kg/cm$^3$ |
| C* | — | — | — | 15 | 40 | 50 | 1.3 | 18 | 32.5 |
| 1 | Random | Glycerine | 10 | 30 | 62 | 73 | 1.45 | 13 | 32.8 |
| 2 | Random | Glycerine | 30 | 26 | 51 | 62 | 1.55 | 12 | 32.2 |
| 3 | Random | Glycerine | 50 | 25 | 50 | 59 | 1.70 | 12 | 32.2 |
| 4 | Random | Glycerine | 70 | 22 | 44 | 54 | 1.97 | 12 | 32.8 |
| 5 | Random | Glycerine | 90 | 21 | 40 | 50 | 1.81 | 12 | 31.3 |

TABLE I-continued

| | Ethoxyolated Polymer[1] | | | Foam Preparation[2] | | | Foam Properties | | |
|---|---|---|---|---|---|---|---|---|---|
| Sample No. | Type | Initiator | EO Content % | Cream Time Sec. | Gel Time Sec. | Tack free Time Sec. | Compressive Strength kPa[3] | Fire Resistance cm[4] | Density[5] kg/cm$^3$ |
| 6 | Random | H$_2$O | 70 | 24 | 43 | 50 | 2.30 | 12 | 34.7 |

*Not an example of the present invention.
[1]The ethoxylated polymer is characterized by its type wherein Random means that the ethylene oxide and propylene oxide are randomly polymerized throughout the alkylene oxide polymer chain and cap means the polymer comprises a block of polymerized propylene oxide mers capped with a block of polymerized ethylene oxide mers. Initiator refers to the compound used in initiating polymerization and Content refers to the weight percent of polymerized ethylene oxide mers in the alkylene oxide polymer chain based on the total weight of polymerized ethylene and propylene in the polymer.
[2]In the foam preparation, the cream time is the time following initiation of mixin when the reaction mixture turns creamy (i.e., achieves a white appearance), gel time is measured by moving a tongue depressor up and down in the rising foam andis recorded as that time when the first strings are created by the tongue depressor and tack free time is the time mixture at which the foam surface is sufficiently cured so that it does not adhere to a new tongue depressor.
[3]The compressive stength is determined by techiniques of ASTM test method designated D-1621-3.
[4]The fire resistant properties are determined using techniques of DIN test method designated DIN 4102.
[5]Density of the foam is determined using techniques described in ASTM test method designated D-1622-63.

As evidenced by the data recorded in Table I, the foam prepared from the combinaton of the polyols prepared using an amine initiator with the ethoxylated alkylene oxide polymer exhibits a superior balance of compressive strength and fire resistant properties than a foam prepared without the ethoxylated alkylene oxide polymer. Moreover, as the amount of polymerized ethylene oxide mers in the alkylene oxide polymer increases, the foam properties, particularly, the compressive strength, shows further improvement with substantial compressive strength improvement occurring as the ethylene oxide content of 30 percent is obtained.

EXAMPLE 3

A rigid polymer foam (Sample No. 1) is prepared as in Example 2 except that the ethoxylated polymer is the reaction product of a propylene oxide adduct of glycerine with ethylene oxide. The polymer is a propylene oxide adduct of glycerine "capped" with 14 percent polymerized ethylene oxide based on the weight of polymerized ethylene and propylene oxide mers and has a hydroxyl number of 36. Additional foams (Samples 2-5) are prepared using other ethylene oxide "capped" polymers containing the various amounts of polymerized ethylene oxide specified in Table II. The cream time, gel time and tack free time is measured during foam preparation. In addition, the compressive strength and fire resistance of the resulting foams are measured. These results are set forth in Table II. For purposes of comparison, the cream time, gel time and tack free time as well as the compressive strength and fire retardant properties of an identical foam except prepared using no ethoxylated alkylene oxide polymer are set forth in Table II.

As evidenced by the data recorded in Table II, the balance of compressive strength and fire retardant properties are superior for the foams prepared using a ethoxylated alkylene oxide polymer as one of the active hydrogen-containing components. As the amounts of ethylene oxide cap increases, the foam's compressive strength also increases. Dramatic compressive strength increases are noted when the polymerized ethylene oxide comprises 20 percent or more of the polymerized alkylene oxide. Ethoxylated polymers comprising greater than 30 percent ethylene oxide cap are not employed since they are undesirably waxy which results in reduced processability.

TABLE II

| | Ethoxyolated Polymer[1] | | | Foam Preparation[2] | | | Foam Properties | | |
|---|---|---|---|---|---|---|---|---|---|
| Sample No. | Type | Initiator | EO Content % | Cream Time Sec. | Gel Time Sec. | Tack free Time Sec. | Compressive Strength kPa[3] | Fire Resistance cm[4] | Density[5] kg/cm$^3$ |
| C* | — | — | — | 15 | 40 | 50 | 1.3 | 18 | 32.5 |
| 1 | Cap | Glycerine | 14 | 28 | 60 | 72 | 1.33 | 14 | 31.3 |
| 2 | Cap | Glycerine | 17 | 28 | 54 | 66 | 1.28 | 14 | 31.6 |
| 3 | Cap | Glycerine | 20 | 26 | 49 | 59 | 1.51 | 13 | 32.5 |
| 4 | Cap | Glycerine | 25 | 23 | 51 | 61 | 1.52 | 13 | 32.2 |
| 5 | Cap | Glycerine | 30 | 27 | 56 | 69 | 1.46 | 13 | 31.3 |

*Not an example of the present invention.
[1]Same as Note 1 in Table I.
[2]Same as Note 2 in Table I.
[3]Same as Note 3 in Table I.
[4]Same as Note 4 in Table I.
[5]Same as Note 5 in Table I.

EXAMPLE 4

A polyol is prepared by reacting a blend of sugar and glycerine with propylene oxide. The resulting polymer has a hydroxy number of 410. A pre-mixture useful in the preparation of rigid polyurethane foam is prepared by admixing 50 parts of this polyol with 50 parts of an ethoxylated alkylene oxide polymer identical to that employed in the preparation of Sample No. 1 of Example 2, 1.2 parts of a foam stabilizer, 0.85 parts of potassium acetate, 1 part water and 32 parts of trichlorofluoromethane. A urethane-modified isocyanurate foam is then prepared by blending this pre-mixture (144 parts) with 180 parts of methylene diisocyanate, placing the resulting foam mixture in a block and allowing the mixture to foam. Other foams (Sample Nos. 2-5) are prepared in an identical manner except using ethoxylated polymers comprised of the various amounts of ethylene oxide specified in Table III. In addition, a foam (Sample No. 6) is prepared in an identical manner except using a water initiated ethoxylated polymer comprised of 30 percent ethylene oxide and 70 percent propylene oxide randomly polymerized throughout the polymer chain as the ethoxylated alkylene oxide polymer. Yet another foam (Sample No. 7) is prepared using a water-initiated polymer prepared from 70 percent ethylene oxide and 30 percent propylene oxide as the ethoxylated polymer component. The cream time, rise time and gel free time exhibited during the preparation and the compressive strength and fire retardant properties of each foam, as well as of an identical foam (Sample No. C) except prepared using only the sugar/glycerine initiated propylene oxide (no ethoxylated polymer employed) are measured and recorded in Table III.

properties to the foams prepared from the glycerine-initiated ethoxylated polymer.

EXAMPLE 5

Several urethane-modified isocyanurate foams (Sample Nos. 1 and 2) are prepared in accordance with this invention in a manner identical to Example No. 4 except that a propylene oxide adduct of glycerine capped with the various amounts of a polymerized ethylene oxide specified in Table IV are employed as the ethoxylated alkylene oxide polymer.

For purposes of comparison a foam (Sample No. C) is prepared using a propylene oxide adduct of glycerine capped with only 8 percent of polymerized ethylene oxide mers.

The cream time, gel time and tack free time exhibited

TABLE III

| | Ethoxyolated Polymer[1] | | | Foam Preparation[2] | | | Foam Properties | | |
|---|---|---|---|---|---|---|---|---|---|
| Sample No. | Type | Initiator | EO Content % | Cream Time Sec. | Gel Time Sec. | Tack free Time Sec. | Compressive Strength kPa[3] | Fire Resistance cm[4] | Density[5] kg/cm[3] |
| C* | — | — | — | 80 | 250 | 350 | 70 | 20 | — |
| 1 | Random | Glycerine | 10 | 60 | 200 | 290 | 110 | 18 | 34.8 |
| 2 | Random | Glycerine | 30 | 50 | 155 | 210 | 152 | 17 | 34.3 |
| 3 | Random | Glycerine | 50 | 45 | 155 | 220 | 178 | 17 | 33.3 |
| 4 | Random | Glycerine | 70 | 40 | 185 | 300 | 181 | 16 | 33.3 |
| 5 | Random | Glycerine | 90 | 40 | 200 | 350 | 177 | 16 | 32.8 |
| 6 | Random | H$_2$O | 30 | 45 | 145 | 195 | 177 | 16 | 32.9 |
| 7 | Random | H$_2$O | 70 | 40 | 195 | 320 | 176 | 18 | 33.6 |

*Not and example of the present invention.
[1]Same as Note 1 in Table I.
[2]Same as Note 2 in Table I.
[3]Same as Note 3 in Table I.
[4]Same as Note 4 in Table I.
[5]Same as Note 5 in Table I.

As evidenced by the data in Table III, the foams prepared from a combination of (1) the ethoxylated polymer having varying amounts of ethylene oxide randomly polymerized throughout the alkylene oxide polymer chain and (2) the glycerine/sucrose initiated polypropylene polyol exhibit excellent compressive strength and fire retardant properties as compared to foams prepared solely from the sugar/glycerine initiated polypropylene glycol. Increases in compressive strength are generally evidenced with increasing amounts of ethylene oxide, with a significant increase in compressive strength experienced when the ethoxylated polymer contains 30 percent ethylene oxide based on the total weight of the polymerized alkylene oxide in the polymer. In addition, with increasing amounts of ethylene oxide in the ethoxylated polymer, coincident improvement in the fire retardant properties are also exhibited. Foams prepared from the water-initiated ethoxylated polymers exhibit essentially equivalent during foam preparation and the density, compressive strength and fire retardant properties of the foam are measured and set forth in Table IV.

TABLE IV

| | Ethoxyolated Polymer[1] | | | Foam Preparation[2] | | | Foam Properties | | |
|---|---|---|---|---|---|---|---|---|---|
| Sample No. | Type | Initiator | EO Content % | Cream Time Sec. | Gel Time Sec. | Tack free Time Sec. | Compressive Strength kPa[3] | Fire Resistance cm[4] | Density[5] kg/cm[3] |
| C* | Cap | Glycerine | 8 | 60 | 205 | 320 | 117 | 20 | 34.9 |
| 1 | Cap | Glycerine | 14 | 55 | 205 | 300 | 140 | 18 | 34.2 |
| 2 | Cap | Glycerine | 30 | 35 | 160 | 265 | 172 | 18 | 34.0 |

*Not an example of the present invention.
[1]Same as Note 1 in Table I.
[2]Same as Note 2 in Table I.
[3]Same as Note 3 in Table I.
[4]Same as Note 4 in Table I.
[5]Same as Note 5 in Table I.

As evidenced by the data presented in Table IV, the compressive strength of the foam increases significantly as the percent ethylene oxide cap increases from 8 to 14 percent. Yet further strength increases are experienced when the percent ethylene oxide cap is increased to 30 percent. In addition, with increasing amounts of ethylene oxide cap, the fire retardant properties are also improved.

EXAMPLE 6

A commercially available dihydric alcohol having an OH number of 180, sold as Dow Resin 565 by The Dow Chemical Company and prepared by reacting one molecule of bisphenol A with two molecules of propylene oxide has a viscosity at 25° C. of over 25000 centipoise (cps). Due to this high viscosity, it is not readily usable in the preparation of isocyanate-derived foams.

To reduce the viscosity of this dihydric alcohol, 70 parts thereof are blended with 30 parts of an ethoxylated, alkylene oxide, polymer, prepared by the reaction of glycerine with a mixed feed of 70 percent ethylene oxide and 30 percent propylene oxide. The resulting mixture has a viscosity of only 13,900 cps at 25° C., a sufficiently low viscosity to make the combination more easily processable. The resulting combination (100 parts) is blended with 1 part water, 22 parts of a fluorocarbon blowing agent, 1.5 parts of a foam stabilizing surfactant, 0.3 parts of a tertiary amine catalyst and 2.5 parts of a quaternary ammonium trimerization catalyst to form a pre-mix formulation.

The pre-mix formulation is blended with 180 parts of methylene diisocyanate and subsequently foamed. During foam formation, a cream time of 40 seconds, a gel time of 110 seconds and a tack free time of 130 seconds is observed. The resulting foam (Foam A) has a density of 34.1 kg/m$^3$, an excellent compressive strength of 236 kPas and fire resistant properties such that the flame height reaches 11 cm when tested according to DIN 4102, Method B-2.

To prepare a composition having a further reduced viscosity, 52.5 parts of the Dow Resin 565 is mixed with 17.5 parts of the ethoxylated, alkylene oxide polymer employed in the preparation of Foam A, 17.5 parts of the active hydrogen-containing compound identical to Polyol B in Example II and 12.5 parts of tris(B-chloroethyl)phosphate. The resulting mixture has a viscosity of only 8000 cps at 25° C. A pre-mix formulation is prepared by mixing this combination (100 parts) with 1 part of a foam stabilizing surfactant, 1.6 parts of a quaternary ammonium trimerization catalyst and 0.8 parts of potassium octoate. The pre-mix formulation is then mixed with 180 parts of methylene diisocyanate and foamed. The resulting foam (Foam B) has a density of 33.1 kg/m$^3$, an excellent compressive strength of 187 kPas and fire resistant properties such that the flame height reaches 11 cm when tested according to DIN 4102, Method B-2.

As evidenced by this Example, the processability of a polyol having an undesirably high viscosity can be improved by employing it in combination with an ethoxylated, alkylene oxide, polymer, to prepare foams of excellent properties.

What is claimed is:

1. A precursor composition for the preparation of rigid foams derived from a polyisocyanate and an active hydrogen-containing compound, said precursor composition comprising (a) an active hydrogen-containing compound containing from 2 to 8 active hydrogens and a hydroxyl number of at least 100 and (b) an ethoxylated alkylene oxide polymer, different from compound (a), containing at least two active hydrogens reactive with an isocyanate, said alkylene oxide polymer having an equivalent weight of at least 300 and being composed of at least 10 weight percent, based on a total weight of the polymerized alkylene oxide in the polymer, of polymerized ethylene oxide.

2. The precursor of claim 1 wherein the ethoxylated alkylene oxide polymer has from 2 to 8 active hydrogen-containing groups, an equivalent weight of at least 500 and a hydroxyl number from 20 to 110.

3. The precursor of claim 2 wherein the ethoxylated, alkylene oxide, polymer has from 2 to 4 active hydrogen-containing groups, an equivalent weight of at least 700 and a hydroxyl number from 20 to 80.

4. The precursor of claim 3 wherein the ethoxylated, alkylene oxide, polymer comprises at least 30 weight percent, based on the total weight of the polymerized alkylene oxide of polymerized ethylene oxide mers.

5. The precursor of claim 2 wherein the ethoxylated, alkylene oxide, polymer comprises at least 50 weight percent, based on the total weight of the polymerized alkylene oxide, of polymerized ethylene oxide mers randomly distributed throughout the polymer chain.

6. The precursor of claim 1 wherein the ethoxylated alkylene polymer is represented by the formula:

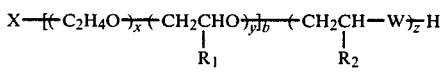

wherein X is the residue of an organic active hydrogen-containing initiator, x is the summation of the ethylene oxide mers, distributed randomly and/or as a block through the alkylene oxide polymer chain; y is the summation of the propylene, butylene and/or pentylene oxide mers distributed randomly and/or as a block through the alkylene oxide polymer chain; $x/(x+y)$ is at least 0.1; $y/(x+y)$ is less than 0.9; $R_1$ is $CH_3$, $C_2H_5$ or $C_3H_7$; $R_2$ is H, $CH_3$, $C_2H_5$ or $C_3H_7$; b is from 2 to 8; W is O, S or NH and x, y, b and z are such that the equivalent of the polymer is from 300 to 2500.

7. The precursor of claim 6 wherein b is from 2 to 6, W is oxygen, and x, y, z and b are such that the equivalent weight is from 500 to 2000.

8. The precursor of claim 7 wherein the polymerized ethylene oxide mers are randomly distributed throughout the alkylene oxide chain, b is from 2 to 4, $R_1$ is $CH_3$, $R_2$ is H or $CH_3$, $x/(x+y)$ is at least 0.4, $y/(x+y)$ is less than 0.6 and x, y, z and b are such that the equivalent weight of the ethoxylated alkylene oxide polymer is from 700 to 1700.

9. The precursor of claim 8 wherein the component (a) comprises a polyoxyalkylene polyol prepared by the reaction of a polyhydric alcohol, thiol or amine; a mono- or di-saccharide or phosphoric acid with ethylene oxide, propylene oxide, butylene oxide, pentylene oxide, styrene oxide, a halo-substituted epoxide, tetrahydrofuran or an alkylene oxide adduct thereof; a hydroxy-terminated polyester; a graft polyol; a hydroxy-terminated polyacetal; or mixtures thereof.

10. The precursor of claim 9 wherein the component (a) comprises a polyoxyalkylene polyol prepared by the reaction of a polyhydric alcohol, thiol or amine; a mono- or di-saccharide, and phosphoric acid with ethylene oxide, propylene oxide, butylene oxide, pentylene oxide, styrene oxide, a halo-substituted epoxide such as epihalohydrin, e.g., epichlorohydrin; tetrahydrofuran or an alkylene oxide adduct thereof or mixtures thereof, said polyalkylene polyol containing from 2 to 5 active hydrogens and possessing a hydroxyl number of 150 to 900.

11. The precursor of claim 10 wherein component (a) is a polyalkylene polyol prepared by the reaction of one or more of the alkylene oxides with a polyhydric aromatic alcohol or amine or a polyhydric alkyl alcohol, a mixture of one or more such polyalkylene polyols with one or more other polyol.

12. The precursor of claim 6 wherein the ethoxylated alkylene oxide polymer is employed in an amount from 5 to 60 weight percent and the other active hydrogen-containing components are employed in an amount from 40 to 95, weight percent, said weight percents being based on the total weight of the active hydrogen-containing components.

13. The precursor composition of claim 1 wherein components (a) and (b) are substantially free of a polymer prepared by polymerizing one or more polymerizable ethylenically unsaturated monomers.

* * * * *